W. F. McRAE.
RAIL JOINT BOLT.
APPLICATION FILED NOV. 7, 1914.
1,207,962.
Patented Dec. 12, 1916.
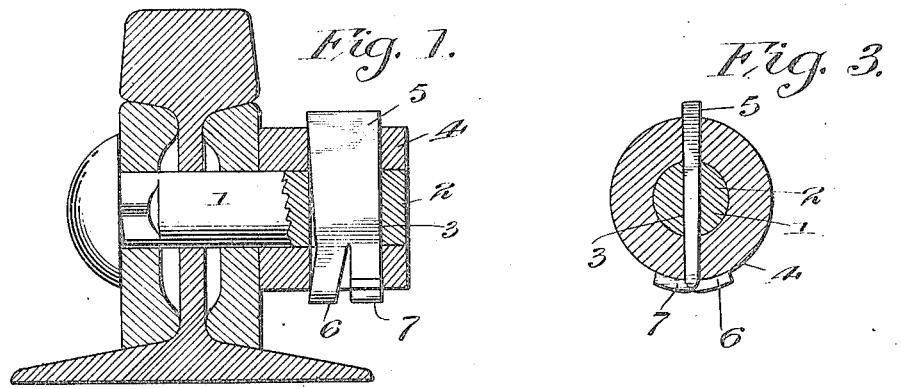
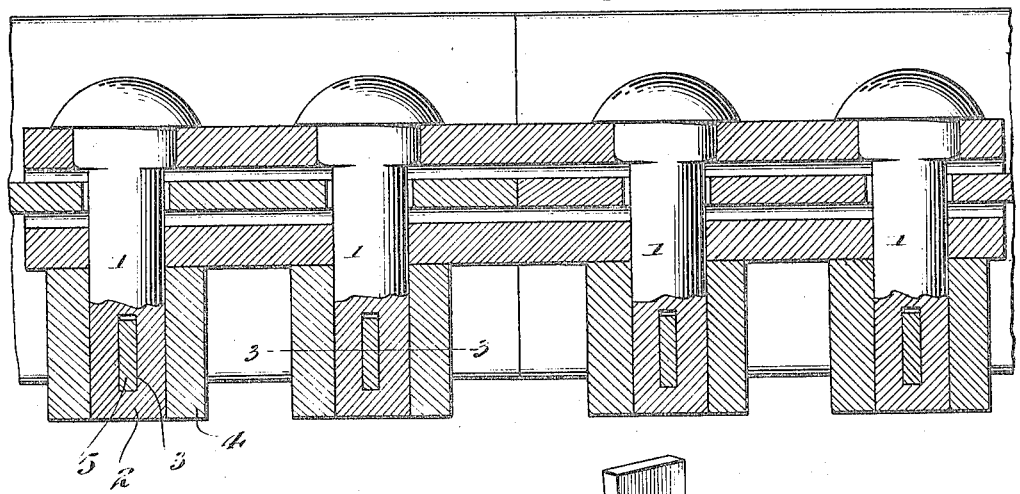
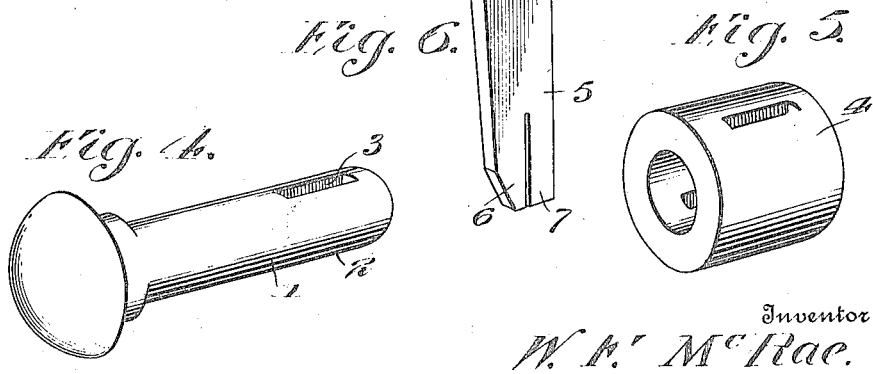
Inventor
W. F. McRae.
Witnesses
By Victor J. Evans
Attorney

UNITED STATES PATENT OFFICE.

WALTER F. McRAE, OF WAYNESBORO, MISSISSIPPI.

RAIL-JOINT BOLT.

1,207,962.  Specification of Letters Patent.  Patented Dec. 12, 1916.

Application filed November 7, 1914. Serial No. 870,888.

*To all whom it may concern:*

Be it known that I, WALTER F. McRAE, a citizen of the United States, residing at Waynesboro, in the county of Wayne and State of Mississippi, have invented new and useful Improvements in Rail-Joint Bolts, of which the following is a specification.

The present invention relates to improvements in rail joint bolts.

The object of the invention is to provide a novel bolt and nut in the form of a collar or sleeve therefor, together with peculiar and novel means for attaching the sleeve to the bolt, at the same time locking the sleeve and bolt against accidental displacement.

The device is primarily adapted for use in connection with rail joints and contemplates the employment of a bolt having a non-threaded shank and a sleeve provided with a smooth bore receiving said shank with both the sleeve and shank of the bolt having elongated registering openings to receive a wedge key, whereby both the head of the bolt and one of the faces or ends of the sleeve will be forced against the opposite fish plate, the key having one of its ends slitted and one of the portions provided by the slit being bent to prevent the accidental removal of the key from the sleeve and bolt, but which also permits of the separation of the sleeve from the bolt when the said bent portion is restored to its original condition.

With the above and other objects in view, the improvement resides in the construction, combination and arrangement of parts set forth in the following specification and falling within the scope of the appended claims.

In the drawings: Figure 1 is a transverse sectional view through a rail joint showing the application of my invention thereon, Fig. 2 is a horizontal sectional view through the rail joint, Fig. 3 is a transverse section on the line 3—3 of Fig. 2, Fig. 4 is a perspective view of the bolt, Fig. 5 is a perspective view of the sleeve, and Fig. 6 is a perspective view of the key.

Referring now to the drawing in detail, the numeral 1 designates a bolt having a head and a shank 2, the said shank being smooth or non-threaded, and in the showing of the drawing, the head of the bolt engages one of the sides of one of the fish plates of a rail joint, a portion of the shank extending a suitable distance beyond the outer face of the second fish plate of the joint and is provided with an elongated slot 3 having oppositely inclined side walls and straight parallel end walls.

The numeral 4 designates a sleeve which is provided with a smooth bore which is adapted to receive the shank of the bolt. The sleeve is provided at diametrically opposite points with elongated openings which communicate with its bore, with each opening having inclined side walls and straight parallel end walls adapted to register with the elongated opening 3 in the shank of the bolt to co-act therewith in forming a wedge shaped channel extending transversely through the bolt and sleeve.

The numeral 5 designates an elongated key having inclined sides to cause the key to taper toward its lower end, said key having one of its side edges beveled from its top to its bottom, and the said key is centrally slitted from what I will term its bottom edge to provide a pair of members designated by the numerals 6 and 7 respectively. The member 6 is arranged upon the tapered edge of the key and is beveled or inclined at its lower portion toward the member 7, and an instrument is arranged within the slot to divide the members 6 and 7 when the sleeve is locked upon the bolt.

It will be noted, by reference to Figs. 1 and 6 of the drawing, that the inclined or beveled edge of the key 5 is arranged upon the side provided with the tongue 6, and therefore, the opposite edge will contact with the outer straight wall provided by the opening in both the sleeve and bolt. When the instrument is inserted within the slit between the members 6 and 7, the member 6 will be sent to bring its outer edge in contact with the inner straight wall in the lower opening of the sleeve 4, as shown in Fig. 1. The ends of the members 6 and 7, after the wedge has been driven home, are bent in opposite directions over the sleeve 4 as illustrated in Fig. 3, and it will be noted that the wedge formation of the key and the particular and peculiar arrangement of the sleeve and bolt will have a tendency to force the head of the sleeve against one of the fish plates and one of the end faces of the bolt against the outer face of the second fish plate when the sleeve is locked upon the bolt.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:—

1. In combination, a bolt having a shank provided with an elongated opening having oppositely inclined side walls and straight parallel end walls, a sleeve adapted to be received on said bolt and having spaced and registering openings therein, each provided with oppositely inclined side walls and straight parallel end walls co-acting with the side and end walls of the opening in the bolt to provide a wedge shaped channel extending transversely through the bolt and sleeve, a key slitted longitudinally for a portion of its length at one end to form prongs adapted to be bent in opposite directions exteriorly of the sleeve when the key is positioned in said channel, said key having oppositely inclined sides adapted to be frictionally engaged with the inclined sides of said channel, a straight wall on said key for contact with an end wall of said channel, an inclined wall on said key adapted to contact with the other wall of said channel at one end thereof, and a beveled portion on the last mentioned inclined wall of the key whereby, when said prongs are slid apart laterally said beveled portion may be brought into contact with the last mentioned end wall of said channel at the other end of the opening.

2. The combination with a bolt having a sleeve thereon and a transversely extending wedge shaped channel passing through the bolt and sleeve, of a wedge shaped key adapted to be received in said channel and slitted longitudinally for a portion of its length near one end to form prongs, said key having a straight side for engagement with one end wall of said channel, and an inclined side adapted to engage the other end wall of said channel at one end thereof, and a beveled portion on the inclined wall of said key, whereby when said prongs are bent in opposite directions and spread apart laterally said beveled portion will be caused to contact with the last mentioned end wall of said channel at the other end thereof.

In testimony whereof I affix my signature in presence of two witnesses.

WALTER F. McRAE.

Witnesses:
E. L. MARTIN,
H. G. NORSWORTHY.